United States Patent
Ishimoda et al.

(10) Patent No.: US 7,808,731 B2
(45) Date of Patent: Oct. 5, 2010

(54) LENS GUIDE MECHANISM, LENS BARREL, AND IMAGE PICKUP APPARATUS

(75) Inventors: Isao Ishimoda, Hachioji (JP); Yoshio Shimazaki, Uenohara (JP)

(73) Assignee: Konica Minolta Opto, Inc., Tokyo (JP)

(*) Notice: Subject to any disclaimer, the term of this patent is extended or adjusted under 35 U.S.C. 154(b) by 406 days.

(21) Appl. No.: 11/973,777

(22) Filed: Oct. 9, 2007

(65) Prior Publication Data

US 2008/0084622 A1    Apr. 10, 2008

(30) Foreign Application Priority Data

Oct. 10, 2006    (JP)    ............................. 2006-276196

(51) Int. Cl.
  *G02B 7/02*    (2006.01)
  *G02B 15/14*    (2006.01)

(52) U.S. Cl. .................. 359/826; 359/822; 359/694

(58) Field of Classification Search ......... 359/694–704, 359/819–824, 829; 396/77–79, 374
  See application file for complete search history.

(56) References Cited

U.S. PATENT DOCUMENTS 5,587,846 A * 12/1996 Miyano et al. .............. 359/824
7,262,926 B2 * 8/2007 Ohsato ....................... 359/814

FOREIGN PATENT DOCUMENTS

JP    08-005888    1/1996

* cited by examiner

*Primary Examiner*—Mohammed Hasan
(74) *Attorney, Agent, or Firm*—Cohen Pontani Lieberman & Pavane LLP

(57) ABSTRACT

The present invention provides a lens guide mechanism, a lens barrel, and an image pickup apparatus. A lens guide mechanism relating to the present invention includes: a plurality of lens frames each including a sliding section; and a guide shaft engaged with the sliding sections of the lens frames for slidably guiding the lens frames along an optical axis. The sliding section includes a contact portion in contact with the guide shaft. The sliding sections of neighboring lens frames are formed so as to overlap with each other at least when the neighboring lens frames come closer to each other.

16 Claims, 8 Drawing Sheets

LENS GUIDE MECHANISM, LENS BARREL, AND IMAGE PICKUP APPARATUS

This application is based on Japanese Patent Application No. 2006-276196 filed on Oct. 10, 2006, in Japanese Patent Office, the entire content of which is hereby incorporated by reference.

TECHNICAL FIELD

The present invention relates to a lens guide mechanism for guiding lens groups in the optical axial direction in a lens barrel and more particularly to a lens guide mechanism suitable to move a plurality of lens groups and perform power variation, a lens barrel, and an image pickup apparatus.

BACKGROUND

Conventionally, there is known a lens guide mechanism using two guide shafts for varying power or focus adjustment, in which a sleeve section formed on each lens frame is engaged with one of the guide shafts with the guide shaft fitting into and passing through the sleeve section and in which a rotation stop section formed on the each lens frame is engaged with the other guide shaft, to slide and guide lens groups in the optical axial direction.

As such a lens guide mechanism, there is a mechanism in which two fitting hole sections where one guide shaft passes through are arranged at a predetermined distance on each lens frame, and one of the fitting hole sections of one of the lens frames is arranged in the gap of the fitting hole sections of the other lens frame so as to be located between the fitting hole sections of the other lens frame. Thus, the span of the guide portion is increased, and the respective lens frames are moved smoothly (for example, refer to the Patent Document Japanese Patent Application H08-5888).

However, in the guide mechanism disclosed in the aforementioned Patent Document, the fitting hole sections of one lens frame are arranged at the both sides of one guide-shaft passing portion of the other lens frame in the gap of the fitting hole sections. It causes a problem that the span of the guide portion is restricted due to the difference in the movement distance between the two lens groups.

Further, the diameter of each fitting hole section has a clearance for the diameter of each guide shaft for movement of the lens frames. Therefore, when the span of the guide portion is short, the lens frames are shifted or tilted by the clearance in the direction perpendicular to the optical axis and it causes a problem that an image is blurred at time of zooming.

SUMMARY

The present invention, with the foregoing in view, is intended to obtain a lens guide mechanism capable of ensuring the span of the guide portion sufficiently long, moving the lens frames more smoothly, and stabilizing an image at time of zooming, a lens barrel, and an image pickup apparatus.

To accomplish the above object, the present invention provides the following lens guide mechanism.

In accordance with one aspect of the present invention, a lens guide mechanism for guiding a plurality of lens groups comprises a plurality of lens frames holding the plurality of lens groups respectively. Each of the lens frames comprises a sliding section integrally formed with the each of the lens frames. The lens guide mechanism further comprises a guide shaft engaged with the sliding sections of the plurality of lens frames for slidably guiding the lens frames along an optical axis. The sliding section comprises a contact portion in contact with the guide shaft and a pressing member pressing the sliding section in a direction so as to come in to contact with the guide shaft.

In accordance with another aspect of the present invention, a lens guide mechanism for guiding a plurality of lens groups comprises a plurality of lens frames holding the plurality of lens groups respectively. Each of the lens frames comprises a sliding section integrally formed with the each of the lens frames. The lens guide mechanism further comprises a guide shaft engaged with the sliding sections of the lens frames for slidably guiding the lens frames along an optical axis. The sliding section comprises a contact portion in contact with the guide shaft and the sliding sections of neighboring lens frames are formed so as to overlap with each other with the guide shaft being arranged between the sliding sections in a cross section of the sliding sections perpendicular to an axis of the guide shaft at least when the neighboring lens frames come closer to each other.

In accordance with another aspect of the present invention, a lens guide mechanism for guiding a plurality of lens groups comprises a plurality of lens frames holding the plurality of lens groups respectively. Each of the lens frames comprises a sliding section and a rotation stop section both integrally formed with the each of the lens frames. The lens guide mechanism further comprises a guide shaft engaged with the sliding section of one of the lens frames and the rotation stop section of another of the lens frames, for slidably guiding the lens frames along an optical axis. The sliding section comprises fitting holes where the guide shaft passes through. The fitting holes are arranged at opposite ends of the sliding section apart at a predetermined distance. The rotation stop section of one of the lens frames is arranged between the fitting hole sections of another of the lens frames.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
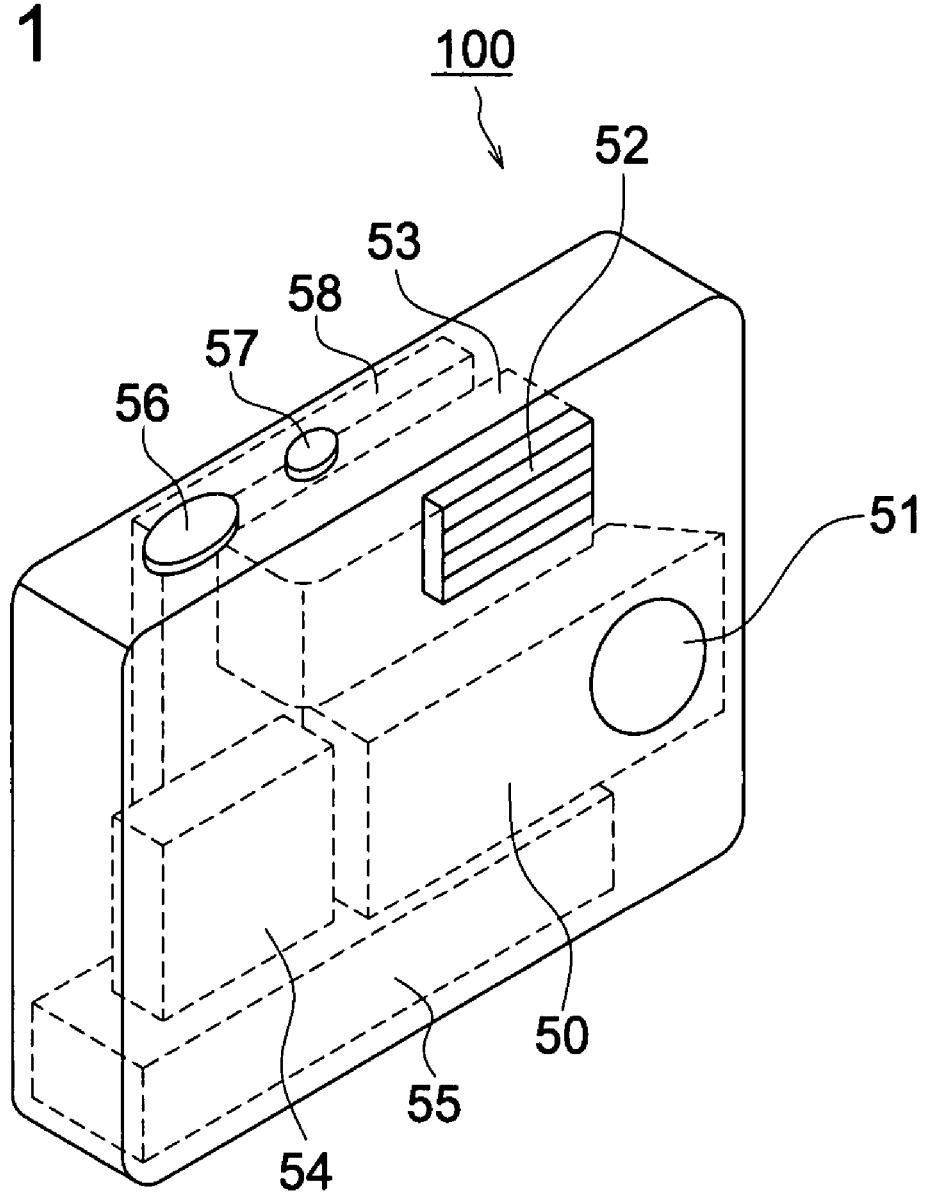
FIG. 1 is a drawing showing an example of the internal arrangement of the essential constitution unit of the camera which is an example of the image pickup apparatus having the lens barrel relating to this embodiment.

Hereinafter, the present invention will be explained in detail by referring to the embodiment, though the present invention is not limited to it.

A lens guide mechanism relating to the present invention is provided for guiding a plurality of lens groups and includes a plurality of lens frames holding the plurality of lens groups respectively. Each of the lens frames comprises a sliding section integrally formed with the each of the lens frames. The lens guide mechanism further includes a guide shaft engaged with the sliding sections of the plurality of lens frames for slidably guiding the lens frames along an optical axis. The sliding section includes a contact portion in contact with the guide shaft and a pressing member pressing the sliding section in a direction so as to come in to contact with the guide shaft.

In the above lens guide mechanism, the contact portion may have a cross section perpendicular to the axis of the guide shaft in a shape of a V-shaped concave or a circular-arc concave.

A lens guide mechanism relating to the present invention is provided for guiding a plurality of lens groups and includes a plurality of lens frames holding the plurality of lens groups respectively. Each of the lens frames includes a sliding section integrally formed with the each of the lens frames. The lens guide mechanism further includes a guide shaft engaged with the sliding sections of the lens frames for slidably guiding the lens frames along an optical axis. The sliding section includes a contact portion in contact with the guide shaft. The sliding sections of neighboring lens frames are formed so as to overlap with each other with the guide shaft being arranged between the sliding sections in a cross section of the sliding sections perpendicular to an axis of the guide shaft at least when the neighboring lens frames come closer to each other.

In the above lens guide mechanism, the sliding section may further include a fitting hole section where the guide shaft passes through.

In the above lens guide mechanism, the sliding section may further include a sleeve section where the guide shaft passes through, and at last three projections extending from the sleeve along the guide shaft. At least a part of the projections may be is in contact with the guide shaft and forms the contact portion.

In the above lens guide mechanism, the projections may be formed such that the projections of one of the lens frames enter into an area of the projections of another of the lens frames where the projections are not formed.

In the above lens guide mechanism, at least one of the projections may be formed so as to press the guide shaft.

In the above lens guide mechanism, the contact portion may have a cross section perpendicular to the axis of the guide shaft in a shape of a V-shaped concave or a circular-arc concave.

A lens guide mechanism relating to the present invention is provided for guiding a plurality of lens groups and includes a plurality of lens frames holding the plurality of lens groups respectively. Each of the lens frames includes a sliding section and a rotation stop section both integrally formed with the each of the lens frames. The lens guide mechanism further includes a guide shaft engaged with the sliding section of one of the lens frames and the rotation stop section of another of the lens frames, for slidably guiding the lens frames along an optical axis. The sliding section includes fitting holes where the guide shaft passes through. The fitting holes are arranged at opposite ends of the sliding section apart at a predetermined distance. The rotation stop section of one of the lens frames is arranged between the fitting hole sections of another of the lens frames.

In the above lens guide mechanism, the rotation stop section of the one of the lens frames and the sliding section of another of the lens frames may be formed so as to overlap with each other in a cross section thereof perpendicular to an axis of the guide shaft.

A lens barrel relating to the present invention includes any one of the above lens guide mechanisms.

An image pickup apparatus relating to the present invention includes the above lens barrel.

According to the present invention, a lens guide mechanism capable of moving more smoothly the lens frames and stabilizing an image at time of zooming can be obtained.

FIG. 1 is a drawing showing an example of the internal arrangement of the essential constitution unit of a camera 100 which is an example of the image pickup apparatus having the lens barrel relating to this embodiment. FIG. 1 is a perspective view of the camera 100 viewed from the object side.

As shown in FIG. 1, the camera 100 is provided with a lens barrel 50 containing a folded image pickup optical system with variable power vertically arranged along the front as shown in the drawing and with an opening 51 formed so as to take in the light flux from the object. Further, there is installed a lens barrier, which is not drawn, for opening and closing the opening 51.

The camera 100 is further provided with a flash emission window 52. Behind the flash emission window 82, there is arranged a flash unit 53 including a light reflector, a xenon tube, a main capacitor, and a circuit substrate. In FIG. 1, there are provided an image recording memory 54 of a card type and a battery 55 which supplies power to each unit of the camera 100. The image recording memory 54 and battery 55 can be mounted or demounted through a cover not drawn.

There is arranged a release button 56 on the top of the camera 100. When the button is pressed to the first stage, the imaging preparation operation of the camera, that is, the focusing operation and beam measuring operation are performed, and when the button is pressed to the second stage, the imaging exposure operation is performed. The camera 100 is also provided with a main switch 57 which changes the operation status of the camera 100 and the non-operation status thereof. When the camera is switched to the operation status by the main switch 57, the lens barrier not drawn is put into the open status and each unit starts operation. Further, when the camera is switched to the non-operation status by the main switch 57, the lens barrier not drawn is put into the closed status and each unit finishes the operation.

On the rear of the camera 100, there is arranged a display unit section 58 composed of a display element such as LCD and an organic EL for displaying an image and character information. There are further arranged operation members on the rear of the camera, which are not drawn, such as a zoom button for performing zoom up and zoom down, a reproduction button for reproducing a picked-up image, a menu button for displaying various menus on the display unit 58, and a selection button for selecting a desired function from the display.

Further, between the above major constitution units, there are arranged circuit substrates which are not drawn. The circuit substrates have various loaded electronic parts for connecting the major constitution units, and drive and control the major constitution units. The camera is further provided with an external I/O terminal, a strap mounting unit, and a tripod seat, which are not drawn.

Figure 2:
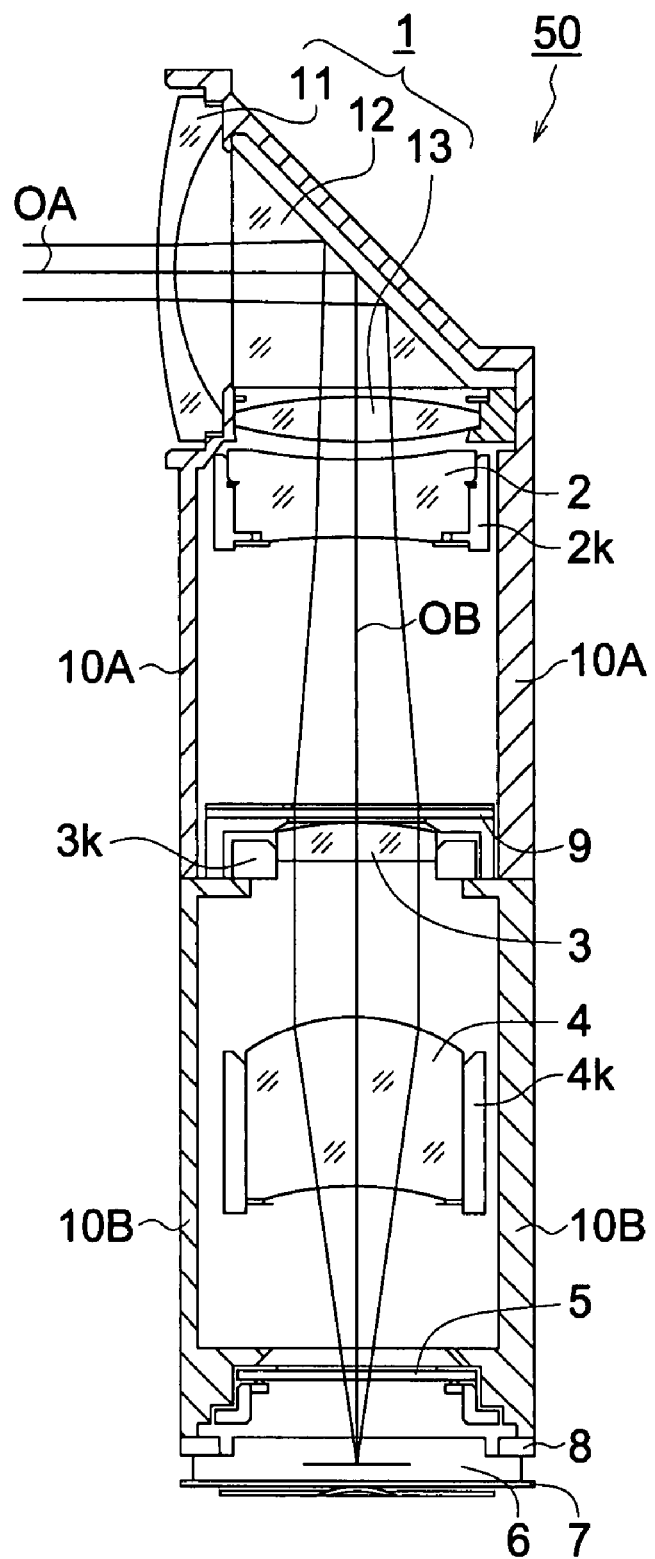
FIG. 2 is a cross sectional view showing the folded image-pickup optical system with variable power built in the lens barrel relating to this embodiment.

FIG. 2 is a cross sectional view showing the folded image-pickup optical system with variable power built in the lens barrel 50 relating to this embodiment. FIG. 2 shows the status thereof at the wide-angle end and it is the cross section cut off at the plane including the two optical axes before and after being bent.

As shown in FIG. 2, OA indicates the optical axis before being bent and OB indicates the optical axis after being bent. The outside of the lens barrel 50 is composed of main barrels 10A and 10B which are barrel members.

The optical system is provided with a first lens group 1. The first lens group 1 is composed of a lens 11 having the optical axis OA and arranged with facing an object, a prism 12 which is a reflection member for bending the optical axis OA almost at right angles, and a lens 13 arranged so as to have the optical axis OB bent by the prism 12. The first lens group 1 is a lens group fixed to the main barrel 10A.

The optical system is further provided with a second lens group 2, which is incorporated in a second lens group frame 2k. The second lens group moves integrally with the second lens group frame 2k at time of varying power (hereinafter, may be referred also to zooming).

The optical system is further provided with a third lens group 3, which is incorporated in the main barrel 10B and does not move.

The optical system is further provided with a fourth lens group 4, which is incorporated in a fourth lens group frame 4k. The fourth lens group is a lens group which moves unitedly with the fourth lens group frame 4k at time of varying power and adjusting focus (hereinafter, may be referred also to focusing).

The optical system is further provided with an optical filter 5 composed of an infrared ray cut filter and an optical low-pass filter which are layered. The optical filter 5 is attached to the main barrel 10B. There is provided an image pickup element 6, for which a CCD (charge coupled device) image sensor or a CMOS (complementary metal-oxide semiconductor) image sensor is used. The image pickup element 6 is attached to a mounting member 8, which is attached to the main barrel 10B together with the image pickup element 6. There is arranged a flexible print substrate 7, which is connected to the image pickup element 6 and the other circuits in the camera. There is arranged a shutter unit 9, which is fixed to the main barrel 10B similarly to a positioning member 3k.

Figure 3:
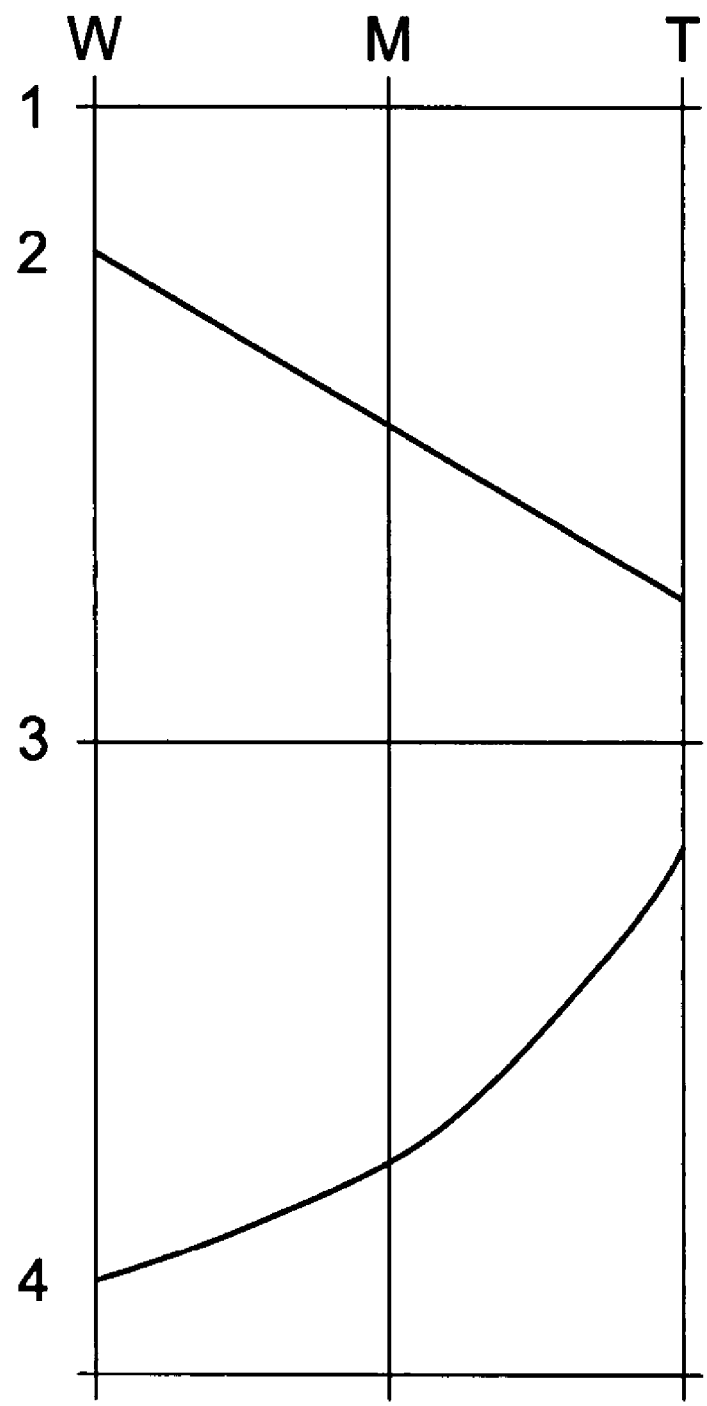
FIG. 3 is a moving chart of each lens group of the folded image-pickup optical system shown in FIG. 2 at time of zooming.

FIG. 3 is a moving chart of each lens group of the folded image-pickup optical system shown in FIG. 2 at time of zooming.

As shown in FIG. 3, the first and third lens groups are stationary lens groups and the second and fourth lens groups move between the wide-angle end (W) and the telephoto end (T) as shown in the drawing, thus the zooming is carried out. Further, the fourth lens group moves additionally from the position to which it moves by zooming, thus the focusing is carried out.

Figure 4:
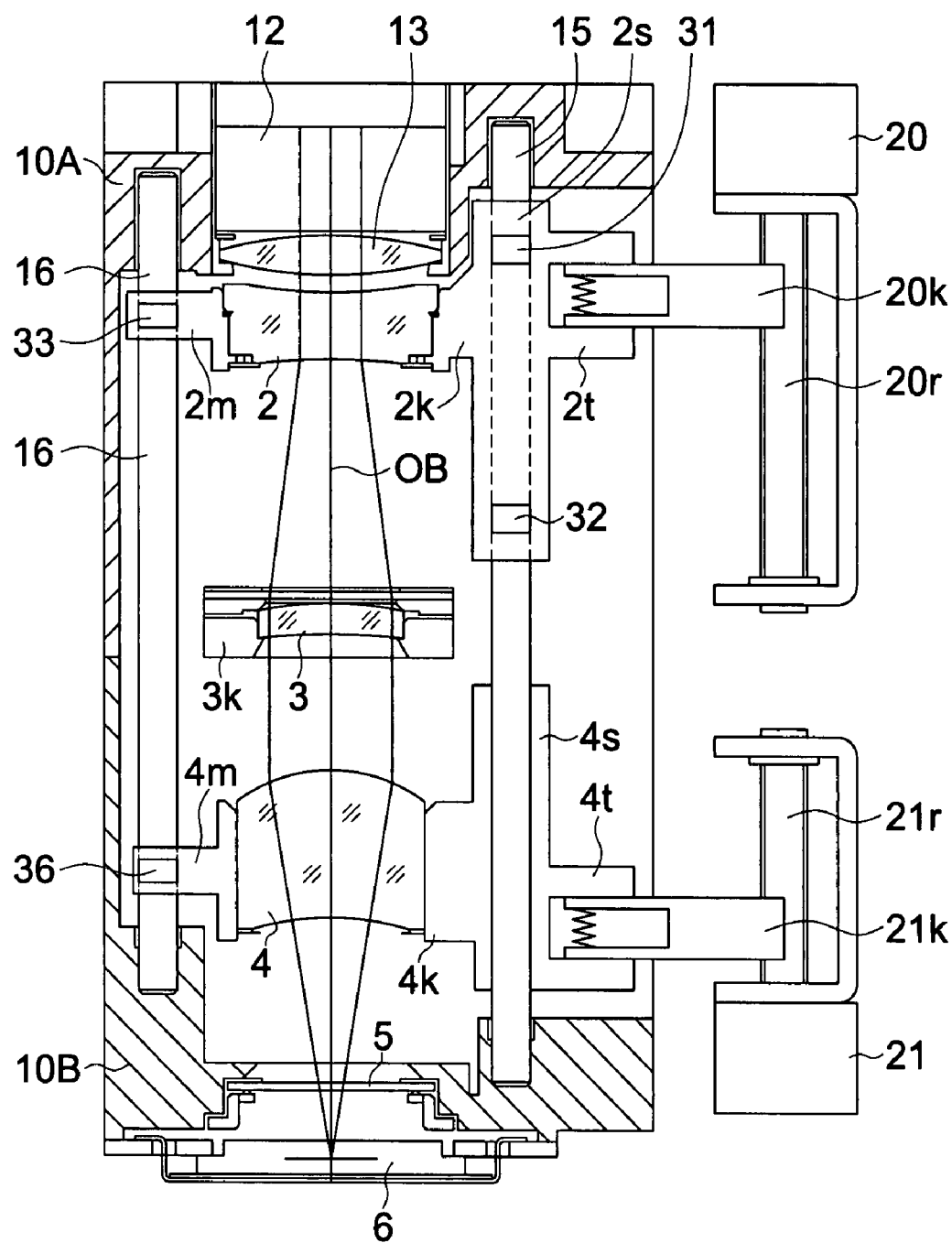
FIG. 4 is a schematic diagram showing the guide mechanism and internal schematic structure of the second lens group and fourth lens group.

FIG. 4 is a schematic diagram showing the guide mechanism and internal schematic structure of the second lens group 2 and fourth lens group 4. FIG. 4 shows the status of the second lens group 2 and fourth lens group 4 at the wide-angle end. Further, FIG. 4, for easy understanding of the explanation, is a drawing schematically illustrating the guide mechanism by moving the motor outside the lens barrel.

As shown in FIG. 4, on the second lens group frame 2k, there is formed a sliding section 2s formed integrally with the second lens group frame as one body, and on the fourth lens group frame 4k, there is formed a sliding section 4s formed integrally with the fourth lens group frame as one body. As for the cross sections of the sliding sections 2s and 4s in the direction perpendicular to a guide shaft 15 which will be described later, the sliding section 2s is arranged on the surface side of the sheet of paper for the guide shaft 15 and the sliding section 4s is arranged on the rear side of the sheet of paper for the guide shaft 15 as shown in FIG. 4.

Magnets 31 and 32 representing a pressing member are attached outside the sliding section 2s. The magnets attract the guide shaft 15 via the sliding section 2s, thus the sliding section 2s is pressed toward the guide shaft 15 and is prevented from separating from the guide shaft 15.

Further, magnets which is not drawn are also attached outside the sliding section 4a and attract the guide shaft 15 via the sliding section 4s, thus the sliding section 4s is pressed so as to be pressed toward the guide shaft 15 and is prevented from separating from the guide shaft 15. In this case, the guide shaft 15 is made of a magnetic material.

Furthermore, the guide shaft 16 is arranged with being engaged with a sliding section 2m formed integrally with the second lens group frame 2k as one body for stopping rotation and a sliding section 4m formed integrally with the fourth lens group frame 4k as one body for stopping rotation. This structure allows the second lens group frame 2k and fourth lens group frame 4k to slide in the direction of the optical axis OB along the guide shafts 15 and 16.

The second lens group frame 2k has a forked projection 2t formed on the sliding section 2s, which is engaged with a drive member 20k moving by rotation of a lead screw 20r formed on the rotary shaft of a first motor 20 which is a stepping motor. By doing this, the second lens group frame 2k engaged with the drive member 20k slides along the guide shafts 15 and 16 due to the rotation of the first motor 20, and moves in the direction of the optical axis OB.

Similarly, the fourth lens group frame 4k has a forked projection 4k formed on the sliding section 4s, which is engaged with a drive member 21k moving by rotation of a lead screw 21r formed on the rotary shaft of a second motor 21 which is a stepping motor. By doing this, the fourth lens group frame 4k engaged with the drive member 21k slides along the guide shafts 15 and 16 due to the rotation of the second motor 21, and moves in the direction of the optical axis OB.

By doing this, the second lens group 2 and fourth lens group 4 move from the positions shown in FIG. 4 as the wide-angle ends in the direction of approaching the third lens group 3 at preset distances and the zooming is carried out. Furthermore, the fourth lens group 4 further moves from the position to which it moves by zooming, thus the focusing is carried out.

Further, there are arranged a position sensor for detecting the existence of the second lens group 2 and a position sensor for detecting the existence of the fourth lens group 4, which are not drawn in FIG. 4. As a position sensor, for example, a photointerrupter is used. The position sensors judge whether the shielding portions formed respectively in the second lens group frame 2k and fourth lens group frame 4k shield light between the light emitting system and the light receiving system of each position sensor or are set in the positions free of shielding the light emitting and receiving systems of the position sensors. On the basis of the switching position from the shielding status to the non-shielding status, the position sensors control the rotational directions and rotary rates of the first motor 20 and second motor 21, thus the positions of the lens groups are controlled.

FIGS. 5(a) to 5(d) are more-detailed schematic diagrams of the guide mechanism of the second lens group frame 2k and fourth lens group frame 4k shown in FIG. 4. FIGS. 5(a) to 5(d) are drawings of only the second and fourth lens group frames and guide shafts which are pulled out and the third lens group and others are omitted.

Figure 5:
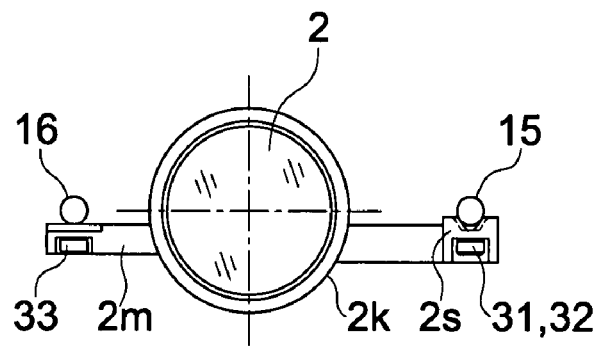
FIGS. 5(a) to 5(d) are more-detailed schematic diagrams of the guide mechanism of the second lens group frame and fourth lens group frame shown in FIG. 4.
Figure 5:
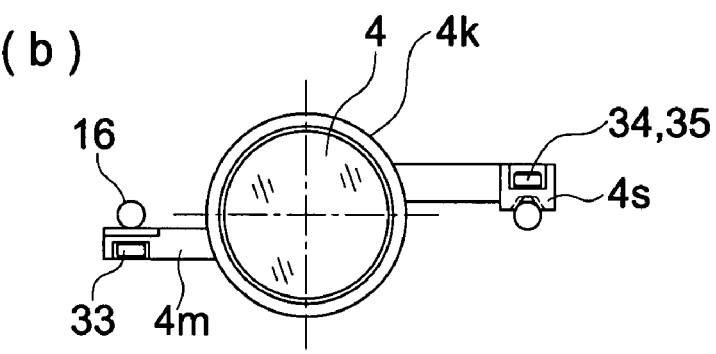
Figure 5:
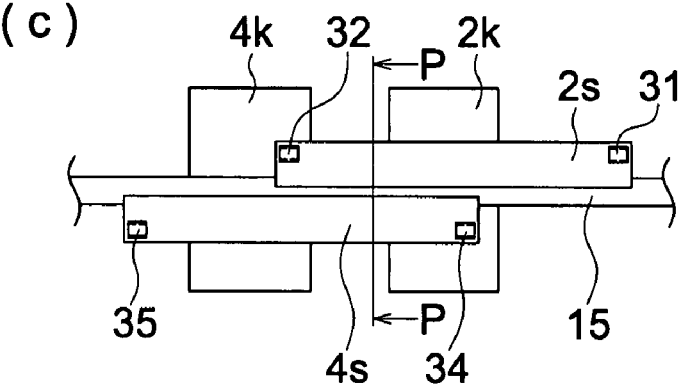
Figure 5:
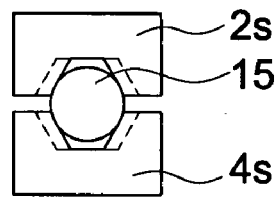

FIG. 5(a) is a drawing of the second lens group frame 2k viewed from the side of the first lens group 1, and FIG. 5(b) is a drawing of the fourth lens group frame 4k viewed from the side of the third lens group 3, and FIG. 5(c) is a side view of the second lens group frame 2k and fourth lens group frame 4k which approach each other viewed from the side of the guide shaft 15, and FIG. 5(d) is a cross sectional view of the periphery of the guide shaft 15 cut along the line P-P shown in FIG. 5(c).

As shown in FIG. 5(a), the sliding section 2s of the second lens group frame 2k has a contact portion in contact with the guide shaft and the contact portion is formed in a V-shaped concave. The sliding section 2s is in contact with the cylindrical guide shaft 15 at the V-shaped portion. On the rear of the sliding section 2s, the magnets 31 and 32 are arranged and the sliding section 2s slides along the guide shaft 15 with being clipped and held by the guide shaft 15 and the attraction force of the magnets 31 and 32. Further, the contact portion in contact with the guide shaft 15 may be in a shape of a circular-arc concave.

Further, the other sliding section 2m which is a rotation stop section of the second lens group frame 2k has a surface in contact with the guide shaft 16, and is equipped with a magnet 33 arranged on the rear of the surface. The sliding section 2m slides along the guide shaft 16 with being clipped and held by the guide shaft 16 and the attraction force of the magnet 33. The other sliding section 2m which is a rotation stop section, instead of the constitution that it is clipped and held between the magnet 33 and the guide shaft 16, may be formed in a general U shape and the guide shaft 16 may be fit into it.

On the other hand, as shown in FIG. 5(b), the sliding section 4s of the fourth lens group frame 4k has a contact portion in contact with the guide shaft and formed in a shape of V-shaped concave in the position on the opposite side of the sliding section 2s of the second lens group frame 2k across the guide shaft 15. The sliding section 4s is in contact with the cylindrical guide shaft 15 at the portion in a shape of V-shaped concave. On the rear of the sliding section 4s, magnets 34 and 35 are arranged and the sliding section 4s slides along the guide shaft 15 with being clipped and held by the guide shaft 15 and the attraction force of the magnets 34 and 35. Further, the portion in contact with the guide shaft 15 may be in a shape of a circular-arc concave.

The other sliding section 4m which is a rotation stop section of the fourth lens group frame 4k has the same constitution as that of the second lens group frame 2m.

As shown in FIGS. 5(c) and 5(d), when the second lens group frame 2k and fourth lens group frame 4k come close to each other, the respective sliding sections 2s and 4s are formed to be arranged in the opposite positions of the guide shaft 15, so that they will not interfere with each other at the cross section perpendicular to the axial direction of the guide shaft 15. Therefore, as shown in FIGS. 5(c) and 5(d), when viewed at the cross section of the sliding sections perpendicular to the guide shaft 15, the sliding sections can be positioned so as to overlap with each other with the guide shaft being arranged between the sliding sections. Therefore, in the axial direction of the guide shaft 15, the sliding sections 2s and 4s can be ensured sufficiently long.

Figure 6:
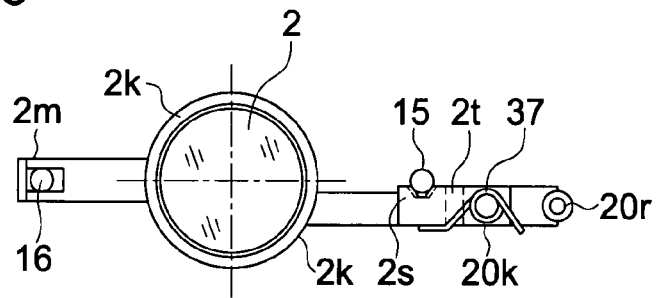
FIG. 6 is a drawing showing another example of pressing the sliding section having a section formed in a V shape in the direction of making contact with the guide shaft.

FIG. 6 is a drawing showing another example of pressing the sliding section having a cross section formed in a shape of a V-shaped concave, in the direction to come in contact with the guide shaft 15. This embodiment will be explained by referring to the second lens group frame 2k.

In the second lens group frame 2k shown in FIG. 6, the sliding section 2m which is a rotation stop section is formed in a U shape and is engaged with the guide shaft 16. On the other hand, the sliding section 2s engaged with the guide shaft 15 has a cross section formed in a shape of a V-shaped concave. The drive member 20k is engaged with the forked projection 2t and screwing with the lead screw 20r, and a spring 37 as a pressing member is attached to the drive member 20k. The spring 37 is suspended by the drive member 20k at one end thereof, and is suspended by the sliding section 2s at the other end, to press the sliding section 2s in the direction of coming in contact with the guide shaft 15. In this case, the guide shafts 15 and 16 may not be magnetized. By use of such a constitution, the sliding section 2s can also be pressed in the direction of coming in contact with the guide shaft 15. Further, the constitution for pressing is not limited to it and the second lens group frame 2k may be structured so as to be compressed and pressed by a plate spring. The fourth lens group frame 4k can be formed in the same constitution.

Namely, by providing a guide mechanism in which the cross sections of the sliding sections 2s and 4s in the direction perpendicular to the guide shaft 15 are formed in a shape of a V-shaped concave or a circular-arc concave, and the sliding sections are pressed in the direction to come in contact with the guide shaft 15, the spans of the sliding sections 2s and 4s can be ensured sufficiently long. By doing this, the second and fourth lens group frames 2k and 4k can be moved more smoothly and a lens guide mechanism capable of stabilizing an image at time of zooming can be obtained.

Further, in FIGS. 5(a) to 5(d) and FIG. 6, the embodiment is explained by referring to the example that both sliding sections 2s and 4s slide on the guide shaft 15, though the present invention is not limited to it. For example, a constitution may be used that the sliding section 2s of the second lens group frame 2k and the sliding section 4m of the fourth lens group frame 4k for a rotation stop slide on the guide shaft 15, and the sliding section 4s of the fourth lens group frame 4k and the sliding sections 2m of the second lens group frame 2k for rotation stop slide on the guide shaft 16.

Figure 7:
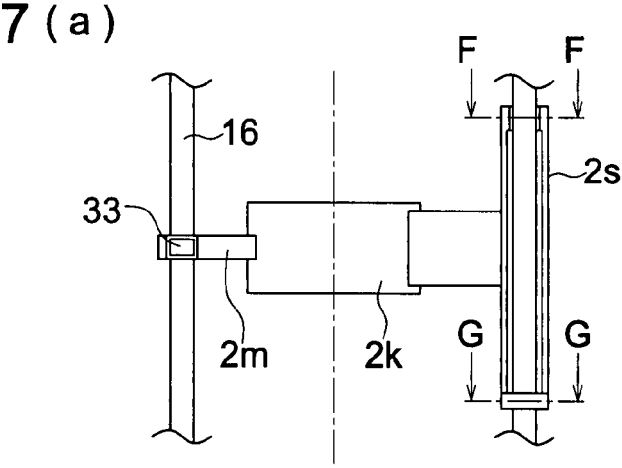
FIGS. 7(a) to 7(d) are drawings showing still another example of the guide mechanism of the second lens group frame and fourth lens group frame.
Figure 7:
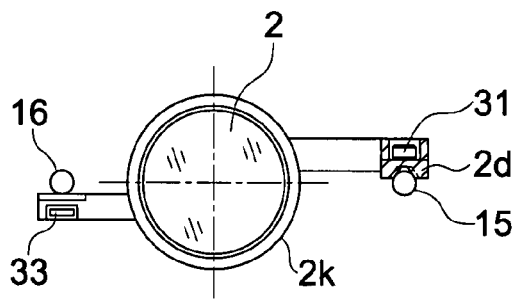
Figure 7:
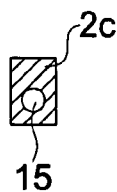
Figure 7:
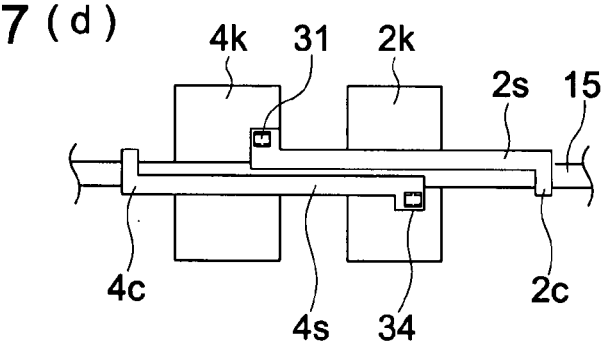

FIGS. 7(a) to 7(d) are drawings showing still another example of the guide mechanism of the second lens group frame 2k and fourth lens group frame 4k. FIG. 7(a) is a side view showing the second lens group frame 2k, and FIG. 7(b) is a cross sectional view of the second lens group frame 2k cut along the line F-F shown in FIG. 7(a), and FIG. 7(c) is a cross sectional view of the second lens group frame 2k cut along the line G-G shown in FIG. 7(a), and FIG. 7(d) is a side view of the second lens group frame 2k and fourth lens group frame 4k which approach with each other viewed from the side of the guide shaft 15. Further, for the examples after FIGS. 7(a) to 7(d), the drawing of the whole lens barrel will be omitted and only the guide mechanism will be explained.

The sliding section 2s of the second lens group frame 2k for the guide shaft 15 shown in FIG. 7(a), includes a fitting hole section 2c at one end thereof as shown in FIG. 7(c) through which the guide shaft 15 passes and has a V-shaped concave portion 2d (contact portion) as shown in FIG. 7(b) at the other end. The V-shaped concave portion 2d is in contact with the cylindrical guide shaft 15. Further, the magnet 31 is arranged on the rear of the V-shaped concave portion 2d, and the sliding section 2s is supported by the fitting hole section 2c and the attraction force by the magnet 31 with the guide shaft 15 to slide along the guide shaft 15.

Further, the other sliding section 2m of the second lens group frame 2k which is a rotation stop section has a surface (contact portion) in contact with the guide shaft 16, and the magnet 33 is arranged on the rear of the sliding section 2m. The sliding section 2m slides along the guide shaft 16 with being clipped and held by the guide shaft 16 and the attraction force of the magnet 33. Further, the other sliding section 2m which is a rotation stop section, instead of the constitution that it is clipped and held between the magnet 33 and the guide shaft 16, may be formed in a general U shape and the guide shaft 16 may be fit into the sliding section 2m.

Further, the sliding section 4s of the fourth lens group frame 4k for the guide shaft 15 includes a V-shaped concave portion (contact portion) at the end thereof close to the second lens group frame 2k and includes a fitting hole section 4c at the end away from the second lens group frame 2k. Further, the V-shaped concave portion of the fourth lens group frame 4k is formed in the position on the opposite side of the V-shaped concave portion 2d of the second lens group frame 2k across the guide shaft 15.

As shown in FIG. 7(d), when the second lens group frame 2k and fourth lens group frame 4k come close to each other, the V-shaped concave portions (contact portions) of the respective sliding sections 2s and 4s are arranged in the opposite positions of the guide shaft 15 and are formed free of interference with each other. Therefore, as shown in FIG. 7(d), the sliding sections 2s and 4s can be positioned so as to overlap with each other on the guide shaft 15. Therefore, the sliding sections 2s and 4s can be ensured sufficiently long in the direction of the guide shaft 15.

Namely, the sliding sections of the second and fourth lens group frames 2k and 4k are formed by the fitting hole sections 2c and 4c through which the guide shaft 15 passes and the V-shaped concave portions (contact portions), thus the spans of the sliding sections 2s and 4s can be ensured sufficiently long. By doing this, the second and fourth lens group frames 2k and 4k can be moved more smoothly and a lens guide mechanism capable of stabilizing an image at time of zooming can be obtained. Further, although the embodiment is explained by referring to the example that one end is formed in a shape of a V-shaped concave, the present invention is not limited to it. The end may be formed in a shape of a circular-arc concave fitting the outer periphery of the guide shaft.

Further, in FIGS. 7(a) to 7(d), the embodiment is explained by referring to the example that both sliding sections 2s and 4s slide on the guide shaft 15, though the present invention is not limited to it. For example, a constitution may be used that the sliding section 2s of the second lens group frame 2k and the sliding section 4m of the fourth lens group frame 4k for rotation stop slide on the guide shaft 15 and the sliding section 4s of the fourth lens group frame 4k and the sliding section 2m of the second lens group frame 2k for rotation stop slide on the guide shaft 16.

Figure 8:
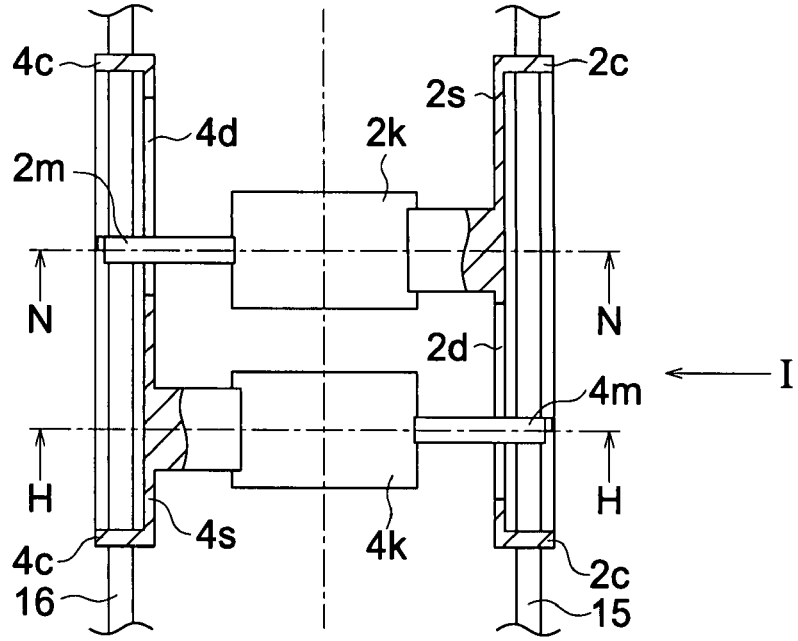
FIGS. 8(a) to 8(d) are drawings showing a further example of the guide mechanism of the second lens group frame and fourth lens group frame.
Figure 8:
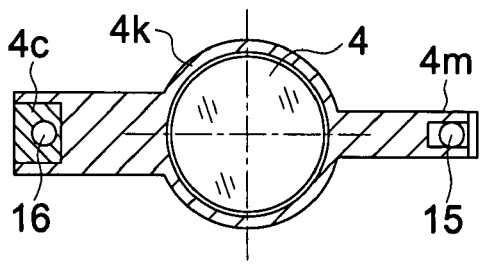
Figure 8:
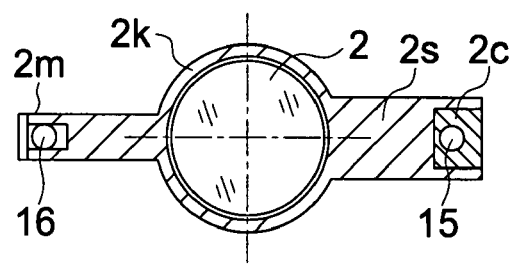
Figure 8:
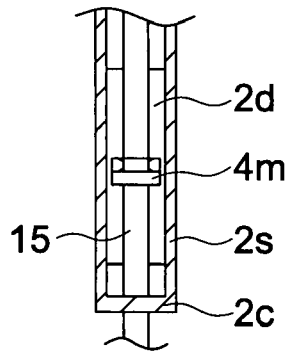

FIGS. 8(a) to 8(d) are drawings showing a further example of the guide mechanism of the second lens group frame 2k and fourth lens group frame 4k. FIG. 8(a) is a side view showing the second lens group frame 2k and fourth lens group frame 4k, and FIG. 8(b) is a cross sectional view of the fourth lens group frame 4k cut along the line H-H shown in FIG. 8(a), and FIG. 8(c) is a cross sectional view of the second lens group frame 2k cut along the line N-N shown in FIG. 8(a), and FIG. 8(d) is a partial side view of the sliding section 2s of the second lens group frame 2k viewed in the I direction shown in FIG. 8(a).

As shown in FIGS. 8(a) and 8(b), the sliding section 4s of the fourth lens group frame 4k for the guide shaft 16, includes the fitting hole sections 4c through which the guide shaft 16 passes at both ends thereof at a predetermined distance. Further, as shown in FIGS. 8(a) and 8(c), the sliding section 2s of the second lens group frame 2k for the guide shaft 15, includes the fitting hole sections 2c through which the guide shaft 15 passes at both ends thereof at a predetermined distance.

The sliding section 2s of the second lens group frame 2k for the guide shaft 15 includes an opening portion 2d formed partially, as shown in FIG. 8(d). As shown in FIGS. 8(a) and 8(d), the sliding section 4m which is a rotation stop section of the fourth lens group frame 4k is inserted into the opening portion 2d, and is engaged with the guide shaft 15. In this constitution, the sliding section 2s of the second lens group frame 2k and the sliding section 4m which is a rotation stop section of the fourth lens group frame 4k are formed so as to overlap with each other in the cross section of the sliding sections perpendicular to the axis of the guide shaft 15. Similarly, the sliding section 4s of the fourth lens group frame 4k for the guide shaft 16 includes an opening portion 4d formed partially and the sliding section 2m which is a rotation stop section of the second lens group frame 2k is inserted into the opening portion 4d, and is engaged with the guide shaft 16. Further, sliding section 4s of the fourth lens group frame 4k and the sliding section 2m which is a rotation stop section of the second lens group frame 2k are formed so as to overlap with each other in the cross section of the sliding sections perpendicular to the axis of the guide shaft 16.

By use of such a constitution, the two fitting hole sections 2c formed in the sliding section 2s of the second lens group frame 2k can be arranged sufficiently away from each other. Similarly, the two fitting hole sections 4c formed in the sliding section 4s of the fourth lens group frame 4k can be also arranged sufficiently away from each other.

Namely, by forming fitting hole sections through which the guide shaft passes in the sliding sections of the second and fourth lens group frames 2k and 4k at both ends at a predetermined distance, and by arranging a sliding section for rotation stop of one lens frame using the opening portion formed partially between the fitting hole sections of the other lens frame arranged away from each other, the distance between the fitting hole sections of the sliding sections 2s and 4s can be ensured sufficiently long. By doing this, the second and fourth lens group frames 2k and 4k can be moved more smoothly and a lens guide mechanism capable of stabilizing an image at time of zooming can be obtained.

Figure 9:
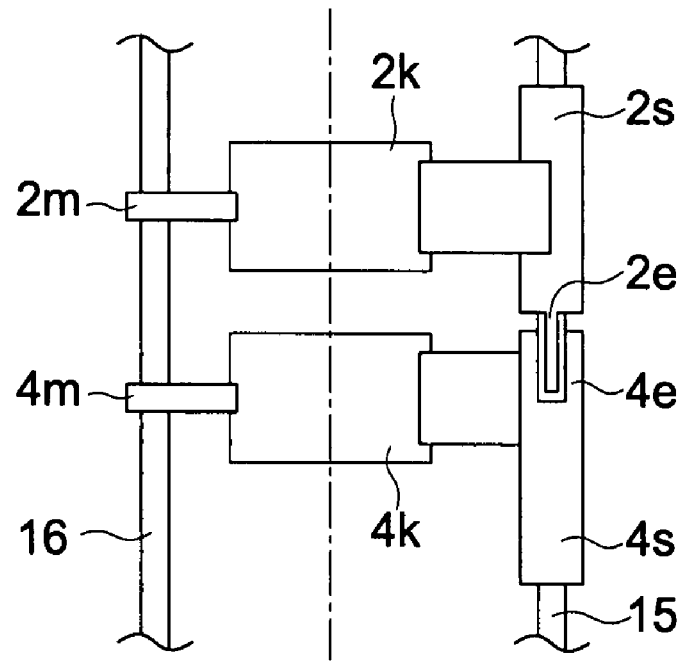
FIGS. 9(a) and 9(b) are drawings showing a still further example of the guide mechanism of the second lens group frame and fourth lens group frame.
Figure 9:
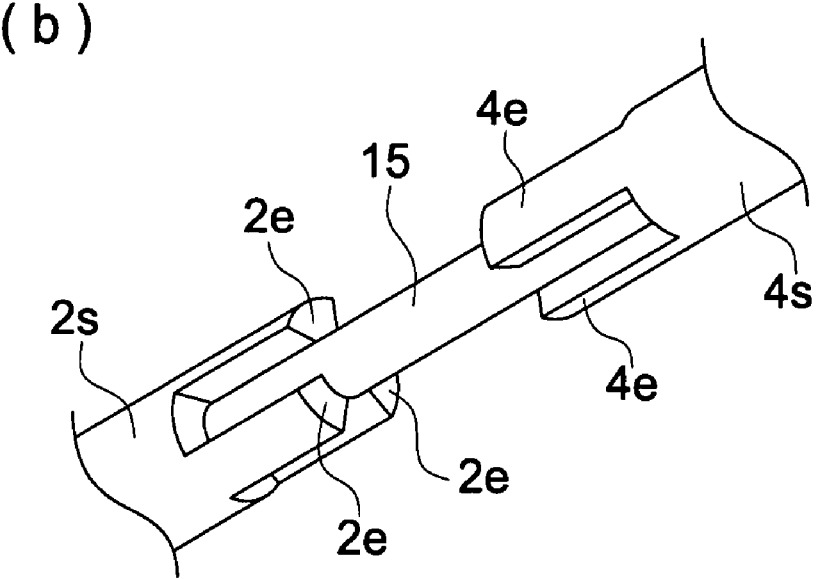

FIGS. 9(a) and 9(b) are drawings showing a still further example of the guide mechanism of the second lens group frame 2k and fourth lens group frame 4k. FIG. 9(a) is a side view showing the status of the second lens group frame 2k and fourth lens group frame 4k which come closer to each other. FIG. 9(b) is a perspective view showing the shapes of the sliding sections of the second lens group frame 2k and fourth lens group frame 4k.

As shown in FIGS. 9(a) and 9(b), the sliding section 2s of the second lens group frame 2k for the guide shaft 15 includes a sleeve section. The guide shaft 15 is engaged with and passing through the sleeve section. The sleeve section includes a plurality of projections 2e (3 projections are shown in FIG. 9(b)) formed on the side of the fourth lens group frame 4k. Similarly, the sliding section 4s of the fourth lens group frame 4k for the guide shaft 15 also includes a sleeve section. The guide shaft 15 is also engaged with and passing through the sleeve section. The sleeve section includes a plurality of projections 4e (3 projections are shown in FIG. 9(b)) formed on the side of the second lens group frame 2k. Further, at least each three projections of 2e and 4e may be formed on the cylindrical guide shaft 15.

Each of projections 2e and 4e has an inner surface in a shape such as the inner surface of the sleeve section extends. Each of projections 2e and 4e further fit to the guide shaft and form a sliding section with the sleeve section. Each of projections 2e and 4e further is in contact with the guide shaft 15 to form a contact portion. In this case, at least a part of the projections may come into contact with the guide shaft 15 to form the contact portion and it is preferable that the contact portion is formed at the end of the projections. Furthermore, the projection 4e is formed so as to enter an area where the projection 2e of the second lens group frame 2k is not formed. Therefore, when the second lens group frame 2k and fourth lens group frame 4k get close to each other, as shown in FIG. 9(a), the projections 2e and 4e are put into a state that they get in mutually.

Namely, by providing sliding sections each formed by the sleeve section through which the guide shaft passes and the plurality of projections extending to the direction of the guide shaft from the sleeve section, and by forming the sliding sections such that the projections of the one lens frame get into the area of one of the other lens frames where no projections are formed, the projections 2e and 4e are formed so as to overlap each other when viewing in a cross section of the projections perpendicular to the axis of the guide shaft 15. In other words, the guide shaft 15 can be used with the projections 2e and 4e overlapping with each other, and the sliding sections can be ensured sufficiently long. By doing this, the second and fourth lens group frames 2k and 4k can be moved more smoothly and a lens guide mechanism capable of stabilizing an image at time of zooming can be obtained.

Furthermore, the inner surfaces of the projections 2e and 4e may be formed so as to be fit to and be in contact with the guide shaft. Though, it is preferable that at least one of the projections is formed in a shape that it is inclined on the guide shaft side when the sliding section is not engaged with the guide shaft and is formed so as to press the guide shaft. Such a structure of the projections reduce play caused in the fitting clearance by pushing the guide shaft aside and the second and fourth lens group frames 2k and 4k can be moved more smoothly.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

For example, the embodiment aforementioned is explained by referring to the example of the lens barrel having a built-in folded optical system, though the present invention is not limited to it. Needless to say, the present invention can be applied to an ordinary lens barrel having no reflection member.

What is claimed is:

1. A lens guide mechanism for guiding a plurality of lens groups, comprising:
a plurality of lens frames holding the plurality of lens groups respectively, each of the lens frames comprising a sliding section integrally formed with the each of the lens frames; and
a guide shaft engaged with the sliding sections of the plurality of lens frames for slidably guiding the lens frames along an optical axis,
wherein the sliding section comprises
a contact portion in contact with the guide shaft and
a pressing member pressing the sliding section in a direction so as to come in to contact with the guide shaft.

2. The lens guide mechanism of claim 1,
wherein the contact portion has a cross section perpendicular to the axis of the guide shaft in a shape of a V-shaped concave or a circular-arc concave.

3. A lens barrel comprising the lens guide mechanism of claim 1.

4. An image pickup apparatus comprising the lens barrel of claim 3.

5. A lens guide mechanism for guiding a plurality of lens groups, comprising:
a plurality of lens frames holding the plurality of lens groups respectively, each of the lens frames comprising a sliding section integrally formed with the each of the lens frames; and
a guide shaft engaged with the sliding sections of the lens frames for slidably guiding the lens frames along an optical axis,
wherein the sliding section comprises a contact portion in contact with the guide shaft and
the sliding sections of neighboring lens frames are formed so as to overlap with each other with the guide shaft being arranged between the sliding sections in a cross section of the sliding sections perpendicular to an axis of the guide shaft at least when the neighboring lens frames come closer to each other.

6. The lens guide mechanism of claim 5,
wherein the sliding section further comprises a fitting hole section where the guide shaft passes through.

7. The lens guide mechanism of claim 5,
wherein the sliding section further comprises
a sleeve section where the guide shaft passes through, and
at last three projections extending from the sleeve along the guide shaft, and
at least a part of the projections is in contact with the guide shaft and forms the contact portion.

8. The lens guide mechanism of claim 7,
the projections are formed such that the projections of one of the lens frames enter into an area of the projections of another of the lens frames where the projections are not formed.

9. The lens guide mechanism of claim 7,
wherein at least one of the projections is formed so as to press the guide shaft.

10. The lens guide mechanism of claim 5,
wherein the contact portion has a cross section perpendicular to the axis of the guide shaft in a shape of a V-shaped concave or a circular-arc concave.

11. A lens barrel comprising the lens guide mechanism of claim 5.

12. An image pickup apparatus comprising the lens barrel of claim 6.

13. A lens guide mechanism for guiding a plurality of lens groups, comprising:
a plurality of lens frames holding the plurality of lens groups respectively, each of the lens frames comprising a sliding section and a rotation stop section both integrally formed with the each of the lens frames; and a guide shaft engaged with the sliding section of one of the lens frames and the rotation stop section of another of the lens frames, for slidably guiding the lens frames along an optical axis, wherein the sliding section comprises fitting holes where the guide shaft passes through, the fitting holes being arranged at opposite ends of the sliding section apart at a predetermined distance, and the rotation stop section of one of the lens frames is arranged between the fitting hole sections of another of the lens frames.

14. The lens guide mechanism of claim 13,
wherein the rotation stop section of the one of the lens frames and the sliding section of another of the lens frames are formed so as to overlap with each other in a cross section thereof perpendicular to an axis of the guide shaft.

15. A lens barrel comprising the lens guide mechanism of claim 13.

16. An image pickup apparatus comprising the lens barrel of claim 13.

* * * * *